Patented May 29, 1945

2,377,233

UNITED STATES PATENT OFFICE 2,377,233

PREPARATION OF MONOETHYL ANILINE

Alfred Garrett Hill, North Branch, and Ralph E. Sayre, Metuchen, N. J., assignors to American Cyanamid Company, New York, N. Y., a corporation of Maine No Drawing. Application March 4, 1941,
Serial No. 381,668

2 Claims. (Cl. 260—577)

This invention relates to an improved method of producing mono-ethyl aniline.

In the past aniline has been reacted with ethyl alcohol in the presence of condensing agents or catalysts such as hydrochloric acid and sulfuric acid or iodine. When sulfuric acid is used as a catalyst a mixture of monoethyl aniline and diethyl aniline is produced. This is undesirable when monoethyl aniline is the main product, and it is the purpose of the present invention to produce monoethyl aniline in a much higher percentage. We have found that by operating at lower temperatures than those which were formerly employed and by reducing the time cycle, the amount of monoethyl aniline can be very greatly increased. While the temperature is not critical we have found it desirable to work between 180 and 230° C., with the preferred range being 200–220° C. The time cycle should not exceed 2 hours at 230°, 4 hours at 220°, 8 hours at 210°, 16 hours at 200°, 32 hours at 190°, or 64 hours at 180°. It will be noted that the maximum temperatures of heating are doubled for each reduction of 10° C. which is in accordance with the observation in many chemical reactions that reaction rates double with each increase of 10°. The time may therefore be expressed by the exponential expression $2^x$ hours in which $x$ is equal to one-tenth the difference between 240° and the reaction temperature.

The amount of sulfuric acid used is quite small and is not critical. Preferably, we use from 0.5 to .15 parts per part aniline. It is also desirable to use an excess of aniline instead of an excess of alcohol, which has been used before. We prefer to use a considerable excess up to 5:1, although the results, even with one part of aniline to one part of alcohol, are better than those obtainable by the procedures used heretofore. A larger excess of aniline can, of course, be used as far as the reaction itself is concerned, but no material improvement is obtained when the excess is greater than 5 to 1, and hence larger amounts are economically useless and merely reduce the output of equipment.

The reaction mixture is not particularly corrosive and steel autoclaves may be used. Stirring, however, should be continuous for best results.

The invention will be described in greater detail in conjunction with the following specific example, which represents a typical practical embodiment of the invention. The parts are by weight.

Example 1

A mixture of 744 parts of aniline, 368 parts of anhydrous ethyl alcohol, and 41.2 parts of 95% sulfuric acid is charged into a steel autoclave provided with a stirrer, is then heated to 210° C., where the temperature is maintained for three hours at a pressure of 240–260#. The autoclave is allowed to cool and is then discharged. The mixture is treated with an excess of caustic soda and subjected to distillation. An alcohol fraction is first taken, consisting of 232 parts. There are then distilled 831 parts of amines and water, from which 787 parts of mixed amines are separated containing 49% aniline, 48% monotheylaniline and 3% diethylaniline. Thus the ratio of monoethylaniline to diethylaniline obtained is 16:1.

We claim:

1. A process of producing monoethylaniline free from large amounts of diethylaniline which comprises adding the mixture of one part of ethyl alcohol with from 2 to 5 parts by weight of aniline at a temperature of between 180 and 230° C. for a period of time not exceeding the exponential expression $2^x$ hours in which $x$ is equal to one-tenth the difference between 240° and the reaction temperature carried out in the presence of sulfuric acid in sufficient amounts to catalyze effectively the reaction.

2. A method according to claim 1 in which the amount of aniline is about 2 parts by weight and the temperature is 210° C.

ALFRED GARRETT HILL.
RALPH E. SAYRE.